Jan. 16, 1951     C. H. KRAYENBÜHL ET AL     2,538,018
CRYSTALLINE PRODUCT OF INSULIN AND ALKALINE
PROTEIN AND PROCESS OF MAKING IT
Filed Aug. 4, 1947

INVENTORS.
CHARLES H. KRAYENBÜHL and
THOMAS ROSENBERG.
BY
Schley, Trask & Jenkins
ATTORNEYS.

Patented Jan. 16, 1951

2,538,018

UNITED STATES PATENT OFFICE 2,538,018

CRYSTALLINE PRODUCT OF INSULIN AND ALKALINE PROTEIN AND PROCESS OF MAKING IT

Charles H. Krayenbühl, Copenhagen, and Thomas Rosenberg, Lyngby, Denmark, assignors to Nordisk Insulinlaboratorium, Gentofte, Copenhagen, Denmark, a corporation of Denmark Application August 4, 1947, Serial No. 766,000
In Denmark April 4, 1944

Section 1, Public Law 690, August 8, 1946
Patent expires April 4, 1964

14 Claims. (Cl. 167—75)

Our invention relates to suspensions of crystalline products of insulin and alkaline proteins of the class consisting of protamines and split products of protamines, and to the process of making such crystalline products; and to compositions of such crystalline products in suspension with unmodified insulin.

The "alkaline proteins" which may be used in the making of these crystalline products consist of protamines as a class, which protamines have alkaline isoelectric points; and those split products of protamines which contain amino acids and which have more alkaline isoelectric points than insulin has and which at pH values between their isoelectric points and the isoelectric point of insulin produce precipitation with insulin. Our invention is especially concerned with the formation of crystalline products of those alkaline proteins with insulin.

It is the main object of our invention to obtain such crystalline products of insulin and those alkaline proteins, with various benefits that result from that crystalline form. Thus, for instance, the crystals in suspension do not tend to clump into aggregates, and do not adhere to the walls of the container. They can readily be separated from a mother liquor, and resuspended in a different liquid, of the same or different nature. They can be isolated readily, and dried. They have surfaces which are small in comparison to the surfaces of amorphous products of insulin and those alkaline proteins, and therefore offer less opportunity for adsorption of other things on them.

It is a further object to produce a prolonged insulin effect of definite and uniform character by the use of such crystalline products, and an effect which can be modified with certainty of result by mixing with additional insulin.

It is a still further object to make it possible to obtain in a single preparation both a prompt insulin action and a separate prolonged insulin action, as distinguished from merely obtaining an intermediate between the quick action of unmodified insulin and the prolonged action of the usual amorphous protamine-insulin or protamine-zinc-insulin, by putting together such crystalline products of insulin and alkaline proteins in suspension with unmodified insulin.

Figure 1:
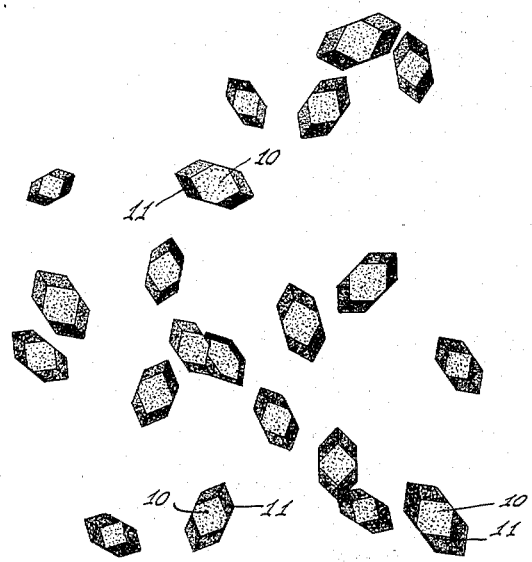
Figure 2:
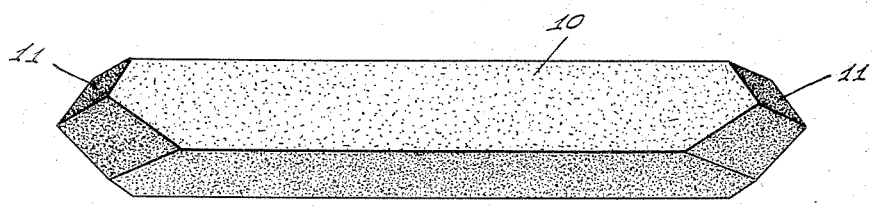

The accompanying drawing illustrates crystalline products embodying our invention. Fig. 1 is a plan, on a highly magnified scale, of a group of crystals produced from a protamine-insulin preparation in accordance with our invention; and Fig. 2 is a view taken obliquely downwardly, on a still more highly magnified scale, of a single crystal produced from a protamine-insulin preparation in accordance with our invention under conditions which give considerable elongation to the crystal structure.

As is well-known, unmodified insulin must usually be administered several times a day, the number of doses depending upon the severity of the patient's diabetes, and its effect between doses is far from uniform; for after each injection there tends to be for a time too great an insulin effect (a peak effect) and a corresponding tendency to hypoglycemia, while after a few hours the insulin effect largely or entirely disappears and there arises a tendency to the diabetic condition of hyperglycemia.

A number of things have been done in an effort to meet this situation, and to provide a delayed and more uniform insulin action with a reduction in the number of doses per day. By far the most successful of these have involved putting together insulin and an alkaline protein, sometimes with and sometimes without zinc in addition. Among the alkaline proteins used are protamines, histones, and globins; and of these the preparations using a protamine as the alkaline protein have gone most extensively into use and have been exceedingly successful, both as protamine-insulin and as protamine-zinc-insulin. Protamine-insulin is set forth in the Hagedorn, Jensen and Wodstrup-Nielsen Patent No. 2,076,082, granted April 6, 1937; protamine-zinc-insulin is set forth in the Scott and Fisher Patent No. 2,179,384, granted November 7, 1939; and histone-zinc-insulin is set forth in the Scott and Fisher Patent No. 2,232,641, granted February 18, 1941. In addition, compositions of insulin with kyrin, histones, globins, and protamines are set forth in the original paper on Protamine Insulinate, by Hagedorn, Jensen, Krarup, and Wodstrup, published January 17, 1936, in the Journal of the American Medical Association, vol. 106, pages 177–180.

Insulin itself has an isoelectric point at about pH 5.0 to pH 5.5, where it is least water-soluble and is relatively water-insoluble; and unmodified insulin is prepared as a water solution of insulin on the acid side of that isoelectric point, commonly at about pH 2.5 to pH 3.5, and when injected is soon brought to about the pH of the body tissue fluids, in the neighborhood of pH 7.2, where it is also quite readily soluble.

By the term "alkaline proteins" we mean those proteins which have higher isoelectric points on the pH scale than insulin has—that is, above about pH 5.5. Most of them have isoelectric points above pH 7. But the alkaline proteins with which the present invention is especially concerned are the protamines and the aforesaid split products of protamines.

If insulin and an alkaline protein contemplated by the present invention, a protamine for instance, are put together in an aqueous medium, they apparently do not combine or interact with each other when the pH is below the isoelectric point of insulin; for under that condition they are similar in character—that is, both on the acid side of their respective isoelectric points. But if the pH is between the isoelectric points of the insulin and of the alkaline protein, the insulin and the alkaline protein are different in character; and so they combine or interact in some way, to form salts or quasi-salts. Such a combination product between the insulin and the alkaline protein has minimum water-solubility closer to the pH of the body tissue fluids than has insulin itself.

Such a combination product of insulin and alkaline protein is taken up relatively slowly by the tissue fluids; probably because of that low water-solubility at or near tissue-fluid pH. This slow taking up of the combination product results in a lowering of the peak effect of the insulin and a lengthening of the period of insulin action.

Hitherto, preparations of insulin with an alkaline protein, such for instance as a protamine, when adjusted to a pH between the isoelectric points of the insulin and the alkaline protein to produce precipitation by reason of the low solubility of the resultant product, in general have been in the form of flocculent amorphous precipitates in suspension, and have not been crystalline. In addition, in order to insure maximum prolongation of insulin effect, the ratio of alkaline protein to insulin, which ratio may be designated $P/I$, has most commonly been such that there was an excess, and usually a considerable excess, of the alkaline protein over the amount required for the combining, and over the "isophane ratio" discussed hereinafter. Because of these things, when attempts were made (as they were) to produce an insulin composition which has both a quick action and a separate prolonged action, by adding insulin to such a suspension of combined insulin and alkaline protein, usually a composition resulted which had an intermediate effect between the quick action of unmodified insulin and the prolonged action of the combination of insulin and alkaline protein, instead of the desired separate quick and prolonged actions. It is probable that this intermediate effect, instead of the two separated actions, is due in part to combining of the added insulin with the excess alkaline protein, and in part to the adsorption of the added insulin on the tremendous surface-area of the flocculent amorphous precipitate of insulin with alkaline protein.

We have found by experiment that insulin is adsorbed to a much less extent on crystals containing insulin and an alkaline protein of the class consisting of protamines and split products of protamines, than it is on preparations containing amorphous precipitates of insulin with alkaline proteins, such for instance as on amorphous protamine-insulin and protamine-zinc-insulin. This is undoubtedly at least largely due to the fact that the crystals have much less surface-area than have the amorphous precipitates. We have also found that in order to form the crystals it is desirable that there be very little if any excess alkaline protein. Thus by using crystalline instead of amorphous preparations we meet both of the difficulties above referred to that lead to the production of the intermediate effect rather than of the separate quick and prolonged effects.

The present invention is concerned with the production of such crystals containing insulin and an alkaline protein of the class consisting of protamines and split products of protamines.

In order to produce such crystals effectively, we have found that certain conditions are necessary.

*First.*—It is useful to produce an approximation to a certain definite ratio of alkaline protein to insulin—that is, a certain definite value of the ratio $P/I$. We call that value the "isophane" ratio, for reasons which will appear.

This "isophane" ratio $P/I$ is determined experimentally for any alkaline protein used and any pH value, for it depends on both of them. The determination is as follows:

A series of equal volumes of an insulin solution is put in a series of separate containers, such as test-tubes, and different amounts of a solution of the desired alkaline protein, a protamine for instance, are added to the different tubes, the amounts of alkaline protein extending over a range which by experiment has been found to include values both above and below the isophane ratio and conveniently differing uniformly; and the whole is adjusted to the desired pH (for instance pH 7.2), by adjustment either before or after the mixing. The mixtures are allowed to stand until precipitation has occurred. The supernatant liquid in each test-tube is then suitably separated from its associated precipitate, and two test portions of that supernatant liquid from each test-tube are tested separately by the addition to one of a sufficient amount of insulin solution and to the other of a sufficient amount of alkaline-protein solution to produce maximum haziness. On the addition of either insulin or alkaline protein such a haziness may be and usually is produced, and is readily observable by a nephelometer.

If the haziness produced is different in the two test-portions from any test-tube, the ratio $P/I$ in that test-tube is not the isophane ratio; and the pairs of test-portions from all the test-tubes except one usually will show that condition. If the test-portion to which the insulin solution was added shows more turbidity than the test-portion to which the alkaline protein was added, it indicates that the test-tube from which those two test-portions were obtained contains a surplus of alkaline protein over the desired isophane value, or (in other words) that the ratio $P/I$ in that test-tube is too high; whereas if the test-portion to which the alkaline protein was added shows more turbidity than the test-portion to which the insulin was added, it indicates that the test-tube from which those two test-portions were obtained contains a surplus of insulin over the desired isophane value, or (in other words) that the ratio $P/I$ in that test-tube is too low.

If, however, the haziness produced is the same in the two test-portions obtained from any test-tube, the ratio $P/I$ in that test-tube is the "isophane" ratio; and the two test-portions from one of the test-tubes may show that condition, and usually will show it if the values extend over a sufficient range and are not too widely spaced. Even though the ratio $P/I$ in no one test-tube is exactly the "isophane" ratio, that isophane ratio is readily determined by plotting the curves of the relative turbidities of the test-portions to which the insulin was added and of the test-portions to which the alkaline protein was added; the two curves intersect at the isophane ratio.

"Isophane" means literally having the "same appearance"; and it is because of the same appearance of the two test-portions from the test-tube that has the proper ratio between alkaline protein and insulin that their ratio in that test-tube is called the "isophane" ratio.

The isophane ratio varies with different alkaline proteins. With most protamines it is somewhere in the neighborhood where $P/I$ equals 1/10; but this is merely a general guide, for it may vary widely from that value.

In addition, it is not necessary for effective crystallization that the ratio $P/I$ be exactly the isophane ratio; for the ratio $P/I$ may vary considerably from the isophane ratio and crystals nevertheless be effectively obtained. For instance, the ratio $P/I$ may be as much as 25% greater or 33⅓% less than the isophane ratio, and crystals still will be obtained; if the ratio $P/I$ is greater than the isophane ratio the crystals will ordinarily be formed rapidly and will be relatively small, and will show a tendency to deformation to that sometimes it is difficult to distinguish the crystal shape; while if the ratio $P/I$ is less than the isophane ratio the crystals will ordinarily be formed more slowly, but will be larger and more distinct, and in general fairly thick and short. By the term "in substantially isophane ratio" we mean within that range.

*Second.*—Zinc must be present. The amount of zinc may vary in amount, from about 0.2% to 5.0% zinc by weight in proportion to the weight of insulin. The amount of zinc present, however, should be at least 0.36% by weight in proportion to the weight of the insulin in order to get abundant and reasonably complete crystallization, for with less zinc the crystallization is less abundant; and it is advantageously at least 0.52%, and so of the order of that used in producing crystals of insulin (at least 0.52% and "desirably three to five times as great as that," or 1.56% to 2.60%) as described in the patent to Scott No. 2,143,590, granted January 10, 1939. So we prefer to have the amount of zinc present equal to about 0.36-0.52% of the weight of the insulin present.

An increase in the amount of zinc present beyond these desirable values does not prevent crystallization, but requires higher pH values in order to obtain optimal crystallization. A sufficient amount of zinc is obtained by using zinc-insulin crystals or solutions made from such zinc-insulin crystals, as now available on the market, as the source of insulin, for those zinc-insulin crystals contain sufficient zinc; but the zinc may be added separately, as in the form of a zinc salt (such for instance as zinc chloride), especially if zinc-insulin crystals are not the source of the insulin.

*Third.*—Phenol or cresol, or a mixture of the two, must also be present. While some other phenol-derivatives are capable of use, they are less advantageous. The cresol may be meta-, ortho-, or para-cresol, or a mixture of these cresols such as the mixture commonly called "tri-cresol" or sometimes simply "cresol." We prefer meta-cresol, or mixtures rich in meta-cresol, to the other cresols; and tricresol is rich in meta-cresol.

The phenol or cresol may vary in concentration, within the range from about 0.05% to 2.0% by volume of the solution from which crystallization is obtained. The permissible range of concentration for abundant and practically complete crystallation, however, is much smaller than that; and has limits which lie between 0.1% and 0.7% and vary with the pH value in a manner which will be discussed after considering the fourth condition for crystallization.

*Fourth.*—A definite pH range is necessary. This varies with the alkaline protein used, with the ratio $P/I$, with the amount of zinc present, and most importantly with the character and amount of the phenolic substance present—phenol or cresol or both. The pH must be at least pH 6.3, so that it is definitely above the isoelectric point of insulin; must be below the isoelectric point of the alkaline protein used, which is a protamine or split product of protamine; and must not be above pH 7.7, to avoid undesirable alkalinity, which decreases the stability of the insulin. Within the broad range from pH 6.3 to pH 7.7, there is a narrower range of about 0.5 pH unit which gives optimal and usually fairly complete crystallization; and this narrower range varies in position along the pH scale in accordance with the other conditions. An increase in the ratio $P/I$ shifts that narrower range slightly upward on the pH scale, and vice versa; an increase in the amount of zinc present shifts that narrower range slightly upward on the pH scale, and vice versa; and, most importantly of all, an increase in the amount of phenolic substance present shifts that narrower range markedly downward on the pH scale, and vice versa. For any combination of conditions, a decrease of pH or any increase in phenol or cresol concentration within the permissible range for optimal crystallization increases the size of crystals obtained but decreases the rate of crystal formation, and vice versa.

For example, with a concentration of 0.5% metacresol by volume in a solution containing a protamine and insulin in isophane ratio and containing 0.3% zinc in proportion to the weight of the insulin, crystals having a length of 40 $\mu$ are obtained at about pH 6.4; whereas to get crystals of the same size when the metacresol is only 0.1% by volume requires approximately pH 7.05. In either case increasing pH decreases the crystal size, and vice versa; with only partial crystallization of the precipitate obtained as the crystal length increases beyond about 50 or 60 $\mu$.

The relation between the percentage concentration by volume of the phenolic substance (phenol or cresol or a mixture of them) in proportion to the total volume of liquid from which the crystallization is obtained, and the pH value, is represented by certain empiracal formulas, as follows:

If the phenolic substance is cresol, (a) the desirable cresol concentration, $C_c$, required to produce abundant protamine-zinc-insulin crystals of a certain desired size is between 0.1% and 0.7% by volume of the total volume from which crystallization is obtained, and (b) the pH for any given value of $C_c$ is greater than $$\frac{k_2' - \log C_c}{k_1'}$$

and less than $$\frac{k_2'' - \log C_c}{k_1'}$$

where
$k_1' = 1.067$
$k_2' = 6.42$
$k_1'' = 0.634$
$k_2'' = 3.87$
and the pH is between pH 6.3 and pH 7.7.

If the phenolic substance is phenol, (a) the desirable phenol concentration, $C_p$, required to produce abundant protamine-zinc-insulin crystals of certain desired size is also between 0.1% and 0.7% by volume of the total volume from which crystallization is obtained, and (b) the pH for any given value of $C_p$ is greater than $$\frac{k_2' - \log C_p}{k_1'}$$

and less than $$\frac{k_2'' - \log C_p}{k_1''}$$

where $k_1' = 0.26$
$k_2' = 1.58$
$k_1'' = 0.094$
$k_2'' = 0.55$ and the pH is between pH 6.3 and pH 7.7.

If the phenolic substance is a mixture of cresol and phenol, (a) the desirable concentration of the mixture by volume, $C_{c+p}$ (in which the subscripts $c$ and $p$ are respectively the concentrations of cresol and phenol in the mixture) required to produce abundant protamine-zinc-insulin crystals of the certain desired size is also between 0.1% and 0.7% by volume of the total volume from which crystallization is obtained, and (b) the pH for any given value of $C_{c+p}$ is greater than $$\frac{k_2' - \log C_{c+p}}{k_1'}$$

and less than $$\frac{k_2'' - \log C_{c+p}}{k_1''}$$

where $k_1' = 1.667 - (0.0081 \times P_p)$
$k_2' = 6.42 - (0.0484 \times P_p)$
$k_1'' = 0.634 - (0.0054 \times P_p)$
$k_2'' = 3.87 - (0.0332 \times P_p)$ where $P_p$ is the percentage of phenol by weight in the cresol-phenol mixture, and the pH is between pH 6.3 and pH 7.7.

*Fifth.*—The temperature for crystallization is desirably not in excess of 20° C., although it is of course sufficiently high to prevent freezing. A convenient temperature for effective crystallization is between 15° and 20° C.

In addition to these essentials, other ingredients may also be present at crystallization. For one example, either sodium phosphate or sodium acetate, or both, may be present as a buffer, to give the desired pH; but they are not necessary. For another example, solutes may be present to produce isotonic conditions, or approximately isotonic conditions; for instance, sodium chloride, glycerine, or glucose may be used. A variation in the concentration of solutes brings about a slight shift in the pH required to produce crystals of a certain size, but this may be disregarded.

The presence of other things besides the insulin and the alkaline protein directly involved has an effect on the isophane value of the ratio $P/I$, and in general lowers that isophane value. For instance, the isophane value at any pH is definitely lower if zinc is present than if zinc is not present. Therefore, it is desirable to determine the isophane value of the ratio $P/I$ both at the desired pH and in the presence of the other ingredients used.

In preparing our crystalline product of insulin and alkaline protein, (a protamine or split product of protamine), we desirably first make a test solution of insulin without the alkaline protein, and add to it whatever other ingredients are desired; such as the necessary zinc, the phenol or cresol in an amount determined in accordance with the above formulas, and sodium chloride or glycerine or glucose or sodium phosphate or sodium acetate or some mixture of them; and then we adjust if necessary to the desired pH; and then in the manner already described we determine the isophane value of the ratio $P/I$ for that test solution of insulin and the desired alkaline protein, such for instance as a protamine.

Then the full quantities of insulin and the desired alkaline protein, such as a protamine, in desired ratio, which may or may not be the isophane ratio as thus determined but should be "in substantially isophane ratio," and of the various other ingredients in the same proportions as in the test solution, are put together, in water, in any desired sequence, to produce the desired pH value between pH 6.3 and pH 7.7. The crystallization occurs, sometimes within a few minutes and in most cases within a few hours; although it may require two or three days, or even longer, if the ratio $P/I$ is not very close to the isophane value. The crystals contain insulin, the alkaline protein (a protamine or a split product of protamine), and zinc; and in the crystals the ratio $P/I$ is the isophane ratio whether or not the ratio $P/I$ in the solution was that isophane ratio.

The crystals formed are for the most part quite small, and indeed almost microscopic or nearly so, with a length usually not over 50 or 60 $\mu$; and so they will pass through a hypodermic needle. In some instances, with slow formation, we have gotten crystals as long as 0.3 millimeter. One such elongated crystal is shown in Fig. 2, with many-fold magnification. Ordinarily the crystals are not so long in proportion to their cross-section as is shown in Fig. 2, although they usually have greater length than width or thickness; for commonly they are more in the form of the crystals shown in Fig. 1, which shows a group of crystals under somewhat less magnification than that used in Fig. 2.

These crystals are distinctly different in shape from crystals of insulin; for the insulin crystals are most frequently rhombohedrons or prisms, sometimes described in the literature as being "double-spindle-shaped." The crystalline product of insulin and protamine, produced by our invention, shows a marked development in length, with a middle portion 10 of square or rectangular cross-section perpendicular to the longest axis, and end portions 11 of generally quadrilateral pyramidal shape at both ends if the crystal is fully formed (which sometimes it is not). The crystal formation, however, sometimes varies widely from this fundamental shape, with various intermediates between long, thin, bi-pyramidal crystals, and short thick, and sometimes octahedral-shaped crystals. Indeed, the crystals which are not octahedral-shaped are really based on the octahedral shape with four of the six corners of the octahedron cut off by planes.

Once the crystals have been formed in suspension, they can readily be separated from the suspending liquid; as by filtration, or even by decantation. If so separated, they may be resuspended in a liquid other than the initial aqueous one in which they are formed.

Commonly, however, the crystals are not separated from the aqueous liquid in which they are formed, but are allowed to remain in that liquid and are so dispensed and so hypodermically administered; for they are commonly used in the treatment of diabetes, in the form of a suspension, and it is most convenient to use them in their original aqueous suspension.

These suspensions of crystals are in general fairly similar in physiological effect to suspensions of amorphous formations of insulin and alkaline protein. In general, the crystalline suspensions have a somewhat longer duration of action than have amorphous preparations of the same $P/I$ ratio.

Further, composite preparations can be made by having present (either initially or by adding later) an excess of unmodified insulin in the suspension of crystalline products of insulin and alkaline protein. In using such composite preparations we can get the quick effect of the unmodified insulin and the separate prolonged effect of the crystalline combination of insulin and alkaline protein.

In adding unmodified insulin to our crystalline product, we usually prefer to use an acid solution of unmodified insulin at a pH of about pH 2.5 to 3.5. While that tends to lower somewhat the pH of the composite product, the presence of a buffer will prevent undue lowering. If desired, however, the pH of the added insulin solution may be adjusted preliminarily away from its normal rather strongly acid reaction to a pH value on the alkaline side of the isoelectric point of the insulin, say at about pH 6.3 to pH 7.7, and then added to our crystalline suspension.

The following are examples of our process, and the products produced thereby:

*Example 1.*—1.6 g. of zinc-insulin crystals containing 0.4% of zinc are dissolved in 400 ml. of water, with the aid of 25 ml. of 0.1 normal hydrochloric acid. To this are added aqueous solutions of 3 ml. of tricresol, 7.6 g. of sodium chloride, and sufficient sodium phosphate buffer that the final concentration is $1/75$ molar and the pH is 6.9. Then 0.14 g. of salmiridine sulfate dissolved in water is added, while shaking. Salmiridine is a protamine derived from the sperm of *Salmo irideus* Gibbons, or rainbow trout. Salmiridine-insulin (a protamine-insulin) containing zinc is promptly precipitated. Enough water is now added to make a total of 1 liter, and the whole is shaken again. After standing for about an hour, the precipitated salmiridine-insulin is found to have become crystalline.

This crystalline salmiridine-insulin can be removed if desired, as by filtration; but it is not necessary to do that, as the suspension of crystalline salmiridine-insulin may be preserved as thus prepared, and dispensed and used (in the same manner as known preparations of protamine insulin and protamine-zinc-insulin are used) in the original suspending medium in which it is formed. Of course, as in other suspensions of protamine insulin, the suspension should be shaken before it is taken up into a hypodermic needle and administered; but that is now well understood in connection with the protamine-insulin suspensions.

*Example 2.*—1.6 g. of zinc-insulin crystals containing 0.4% of zinc, 25 ml. of 0.1 normal hydrochloric acid, 1.2 ml. of metacresol, 7.6 g. of sodium chloride, sufficient sodium phosphate buffer and (if necessary) sodium hydroxide that the final concentration of sodium phosphate will be $1/75$ molar and the pH-value will be 7.35, and 0.16 g. of salmiridine sulfate, are mixed in a sufficient quantity of water so that the final volume is 1 liter. A precipitate occurs of salmiridine-insulin containing zinc; and after standing a few hours the precipitate becomes crystalline.

As in the case of Example 1, the crystalline salmiridine-insulin may be separated from the suspending liquid, if desired, and stored as such and eventually put in some other suspending medium. Ordinarily, however, it is the simplest and most desirable procedure to leave the crystals in the initial suspending medium in which they are formed, and to administer that suspension as such.

*Example 3.*—1.6 g. of zinc-insulin crystals containing 0.4% of zinc, 25 ml. of 0.1 normal hydrochloric acid, 2 ml. of parachlorophenol, 7.6 g. of sodium chloride, sufficient sodium phosphate buffer to make the ultimate suspension $1/75$ molar and the pH-value about 6.9, and 0.12 g. of clupeine sulfate, and sufficient water to make a total of 1 liter, are mixed as in Example 1. Clupeine is a protamine derived from herring sperm. A precipitate of clupeine-insulin containing zinc is produced, as in Example 1. This precipitate, which contains about 25% less clupeine than corresponds to the isophane value of $P/I$, becomes crystalline after standing for a few hours.

*Example 4.*—1.5 g. of zinc-insulin crystals containing 0.5% of zinc, 20 ml. of 0.1 normal hydrochloric acid, 2 g. of metacresol and 1 g. of phenol, and 7.6 g. of sodium chloride and sufficient sodium phosphate buffer that the final concentration is $1/75$ molar and the pH 6.95, 0.13 g. of salmiridine sulfate, and a sufficient quantity of water, are mixed as in Example 1 to give a final volume of 1 liter. A precipitate of salmiridine-insulin containing zinc is precipitated, and on standing a few hours is found to have become crystalline.

*Example 5.*—1.4 g. of amorphous insulin hydrochloride, 5.6 mg. of zinc as zinc chloride, 3 ml. of metacresol, 7.6 g. of sodium chloride, so much sodium phosphate buffer that the final concentration is $1/75$ molar and the pH-value 6.80, 0.11 g. of salmiridine sulfate, and water, are mixed as in Example 1, so that a final volume of 1 liter is obtained. After standing, the precipitate becomes crystalline.

*Example 6.*—1.5 g. of zinc-insulin crystals containing 0.4% of zinc, 20 ml. of 0.1 normal hydrochloric acid, 5.2 g. of phenol, 7.6 g. of sodium chloride, so much sodium phosphate buffer that the final concentration is $1/75$ molar and the pH-value 7.3, and 0.14 g. of salmiridine sulfate, are mixed in a sufficient quantity of water so that the final volume is 1 liter. After standing, the precipitate becomes crystalline.

*Example 7.*—1.6 g. of zinc-insulin crystals containing 0.4% of zinc, 20 ml. of 0.1 n hydrochloric acid, 3 ml. of metacresol, 7.6 g. of sodium chloride, so much sodium phosphate buffer that the final concentration is $1/75$ molar and the pH-value 7.3, and 0.61 g. of a split product of protamine, are mixed in a sufficient quantity of water so that the final volume is 1 liter. After standing, the precipitate becomes crystalline.

The split product of protamine was produced in the following way: 5 g. of salmiridine sulfate were boiled for 2 hours in 100 ml. of water and 2 ml. of 5 n sodium hydroxide. The solution was evaporated to 65 ml., neutralized with 2 n sulfuric acid, and precipitated with 650 ml. of ethyl alcohol (96%).

*Example 8.*—1.6 g. crystalline insulin containing 0.4% zinc, 25 ml. 0.1 normal hydrochloric acid, 0.15 g. zinc chloride, 3 ml. meta-cresol, 7.6 g. of sodium chloride, so much sodium phosphate buffer that the final concentration becomes $1/75$ molar and the pH-value 6.80, 0.15 g. of salmiridine sulfate and water are mixed so that the final volume of 1000 ml. is obtained. The suspension which contains ca. 5% zinc in relation to the quantity of insulin becomes crystalline by standing till the following day.

In the foregoing examples, other protamines may be used instead of the salmiridine of Examples 1, 2, 4, 5, 6, and 8, and the clupeine of Example 3; such for instance as any of the protamines listed in the Hagedorn, Jensen and Wodstrup-Nielsen Patent No. 2,076,082 above referred to.

Except in Example 5, the insulin used was in the form of zinc-insulin crystals. That is a convenient form of insulin for this purpose, because it already contains sufficient zinc. But amorphous insulin or solutions thereof may be used, as indicated in Example 5, even though they are initially free or substantially free from metal, provided sufficient zinc is added to the mixture to produce a concentration of zinc of between about 0.3% and 5.0%.

All the preparations of Examples 1 to 8, and the modifications thereof indicated above, are effective in the treatment of diabetes, with a prolonged insulin action. They are all suspensions of a crystalline product of insulin combined with an alkaline protein and zinc; so that they must be shaken to ensure uniformity of dispersion before being taken up into the hypodermic needle for administration. The crystals are sufficiently small so that they go readily into the hypodermic needle.

If it is desired to have an insulin preparation in which there is both a prompt action and a prolonged action, there may be added to any of these crystalline preparations of Examples 1 to 8 and their modifications any desired amount of a solution of unmodified insulin, desirably adjusted to the usual acid pH of about pH 2.5 to pH 3.5 although permissibly adjusted to about pH 6.3 to pH 7.7 to keep the final product at about that pH. The added insulin apparently remains largely or wholly as such in the suspension of crystals, with little adsorption on the crystals; so that upon administration the unmodified insulin is promptly effective to give the desired prompt insulin effect, while the suspended crystals are slowly taken up by the tissue fluids and give a sparate delayed insulin effect. Any desired combination of prompt and prolonged action may thus be obtained.

Alternatively, Examples 1 to 8 may be varied by having more insulin present at the time of crystallization.

It is possible also to get a greater prolongation of insulin effect by adding excess protamine to the crystal suspension, or by having a greater amount of protamine present during crystallization.

We claim as our invention:

1. The process of producing a crystalline product of insulin and an alkaline protein of the class consisting of protamines and split products of protamines, which consists in bringing the insulin and the alkaline protein together in substantially isophane ratio in an aqueous medium at a pH between pH 6.3 and pH 7.7 and below the isoelectric point of the alkaline protein, in the presence of zinc in an amount between 0.36% and 5.0% of the weight of the insulin, and in the presence of a phenolic substance of the class consisting of cresol and phenol and mixtures thereof, (a) where the phenolic concentration $C_{c+p}$ lies between 0.1% and 0.7% by volume in proportion to the total volume of liquid from which crystallization is obtained, with the subscripts $c$ and $p$ respectively representing the percentage concentrations of cresol and phenol, and (b) where the pH for any given value of $C_{c+p}$ is greater than $$\frac{k_2' - \log C_{c+p}}{k_1'}$$

and less than $$\frac{k_2'' - \log C_{c+p}}{k_1''}$$

where $k_1' = 1.067 - (0.0081 \times P_p)$
$k_2' = 6.42 - (0.0484 \times P_p)$
$k_1'' = 0.634 - (0.0054 \times P_p)$
$k_2'' = 3.87 - (0.0332 \times P_p)$ where $P_p$ is the percentage of phenol by weight in the phenolic substance.

2. The process of producing a crystalline product of insulin and an alkaline protein as set forth in claim 1, in which the alkaline protein is a protamine.

3. The process of producing a crystalline product of insulin and an alkaline protein as set forth in claim 1, in which the phenolic substance is a cresol, (a) where the cresol concentration $C_c$ lies between 0.1% and 0.7% by volume in proportion to the total volume of liquid from which crystallization is obtained, and (b) where the pH for any given value of $C_c$ is greater than $$\frac{k_2' - \log C_c}{k_1'}$$

and less than $$\frac{k_2'' - \log C_c}{k_1''}$$

where $k_1' = 1.067$; $k_2' = 6.42$; $k_1'' = 0.634$; $k_2'' = 3.87$.

4. The process of producing a crystalline product of insulin and an alkaline protein as set forth in claim 3, in which the alkaline protein is a protamine.

5. The process of producing a crystalline product of insulin and an alkaline protein as set forth in claim 3, in which the cresol is metacresol.

6. The process of producing a crystalline product of insulin and an alkaline protein as set forth in claim 1, in which the phenolic substance is phenol, (a) where the phenol concentration $C_p$ lies between 0.4% and 0.7% by volume in proportion to the total volume of liquid from which crystallization is obtained, and (b) where the pH for any given value of $C_p$ is greater than $$\frac{k_2' - \log C_p}{k_1'}$$

and less than $$\frac{k_2'' - \log C_p}{k_1''}$$

where $k_1' = 0.26$
$k_2' = 1.58$
$k_1'' = 0.094$
$k_2'' = 0.55$

7. The process of producing a crystalline product of insulin and an alkaline protein as set forth in claim 6, in which the alkaline protein is a protamine.

8. The process of producing a crystalline product of insulin and an alkaline protein as set forth in claim 1, in which the amount of zinc present is between 0.36% and 2.60% by weight of the insulin.

9. The process of producing a crystalline product of insulin and an alkaline protein as set forth in claim 1, in which the amount of zinc present is at least 0.52% by weight of the insulin.

10. The process of producing a crystalline product of insulin and an alkaline protein as set forth in claim 1, in which the alkaline protein is salmiridine.

11. A therapeutic insulin preparation comprising an aqueous suspension in which the suspended material consists predominantly of crystals of protamine-zinc-insulin, and in which the protamine is in no greater than substantially isophane ratio to the insulin.

12. A therapeutic insulin preparation, comprising an aqueous suspension in which the suspended material consists predominantly of crystals of protamine-zinc-insulin, and in which the protamine is in substantially isophane ratio to the insulin.

13. A therapeutic insulin preparation as set forth in claim 11, in which at least one of the compounds phenol and cresol is present within the range between about 0.1% and 0.7% by volume.

14. A therapeutic insulin preparation as set forth in claim 12, in which at least one of the compounds phenol and cresol is present within the range between about 0.1% and 0.7% by volume.

CHARLES H. KRAYENBÜHL.
THOMAS ROSENBERG.

REFERENCES CITED

The following references are of record in the file of this patent:

UNITED STATES PATENTS

| Number | Name | Date |
|---|---|---|
| 2,076,082 | Hagedorn | Apr. 6, 1937 |
| 2,161,198 | Reiner | June 6, 1939 |
| 2,179,384 | Scott | Nov. 7, 1939 |
| 2,192,386 | Sahyun | Mar. 5, 1940 |
| 2,354,211 | Lang | July 25, 1944 |

FOREIGN PATENTS

| Number | Country | Date |
|---|---|---|
| 64,708 | Denmark | Aug. 19, 1946 |

Certificate of Correction

Patent No. 2,538,018 January 16, 1951

CHARLES H. KRAYENBÜHL ET AL.

It is hereby certified that error appears in the printed specification of the above numbered patent requiring correction as follows:

Column 3, line 66, after "and" insert the word *amorphous*; column 5, line 25, for "to that" read *so that*; column 6, line 2, for "crystallation" read *crystallization*; line 55, for "empiracal" read *empirical*; line 68, in the denominator of the formula reading "$k_1'$" read $k_1''$; column 8, line 22, strike out "The"; line 62, after the word "short" insert a comma; column 9, line 65, after "with" strike out "the"; column 11, line 27, after "suspensions" insert a comma; and that the said Letters Patent should be read as corrected above, so that the same may conform to the record of the case in the Patent Office.

Signed and sealed this 10th day of April, A. D. 1951.

[SEAL]

THOMAS F. MURPHY,
*Assistant Commissioner of Patents.*